Sept. 15, 1970  A. E. MOULTON  3,528,678
CHASSIS FOR COMMERCIAL VEHICLES
Filed June 24, 1968  6 Sheets-Sheet 1

INVENTOR
ALEXANDER ERIC MOULTON
BY
Shoemaker and Mattare
ATTORNEYS

Sept. 15, 1970     A. E. MOULTON     3,528,678
CHASSIS FOR COMMERCIAL VEHICLES
Filed June 24, 1968     6 Sheets-Sheet 3

INVENTOR
ALEXANDER ERIC MOULTON
BY
Shoemaker and Mattare
ATTORNEYS

United States Patent Office 3,528,678
Patented Sept. 15, 1970

3,528,678
CHASSIS FOR COMMERCIAL VEHICLES
Alexander Eric Moulton, Bradford-on-Avon, England, assignor to Moulton Developments Limited, Bradford-on-Avon, Wiltshire, England, a British company
Filed June 24, 1968, Ser. No. 739,365
Claims priority, application Great Britain, June 22, 1967, 28,929/67
Int. Cl. B62d 21/00
U.S. Cl. 280—106          3 Claims

ABSTRACT OF THE DISCLOSURE

A chassis for commercial vehicles wherein each of the wheels is independently suspended with a frame structure between the front and rear wheels allowing smooth riding and good road holding qualities in both laden and unladen conditions.

---

Figure 1:
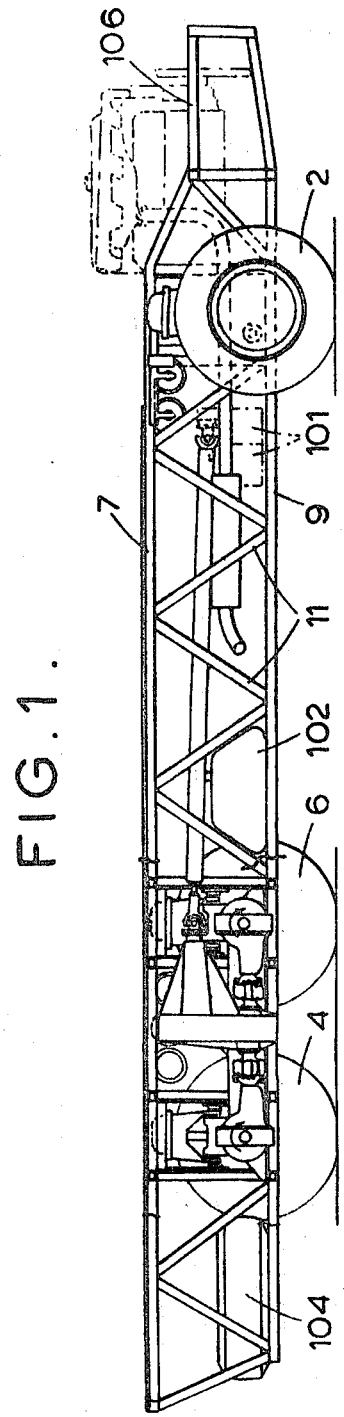

This invention relates to chassis for self-propelled heavy road vehicles that is vehicles having a gross vehicle weight of 10,000 lbs. or more.

Conventional heavy type commercial vehicles of the kind in question are equipped with two or more front steerable wheels and two or more rear non-steerable wheels and the rear wheels may be twin-tyred, in which case such a twin-tyred wheel assembly may be regarded as functioning and is herein referred to as if it were a single wheel.

Conventional vehicles, almost without exception, have for many years included rigid beam axles bridging corresponding wheels at opposite sides of the vehicle whether these be front wheels or rear wheels. The vehicle frame is supported on these axles by leaf springs. Such leaf springs are severely limited as to their softness. The springs are very stiff for two main reasons: firstly, because of the large variation in load encountered between the laden and unladen conditions of the vehicle, and secondly, as the spring base, that is the distance between the springs supported the opposite sides of the axle, is limited by the width of the frame, the capacity of the springs to reduce roll is limited unless they are made particularly stiff. Because of the very stiff springing provided on traditional commercial load-carrying vehicles of the heavy type in question, the frame provided on these known vehicles must be torsionally flexible to provide cross articulation. By the phrase "cross articulation" is meant the ability of the driving wheels to be maintained in contact with the ground, even when other wheels of the vehicle have been lifted or lowered to such an extent that were the frame to be inflexible, the driving wheels would be lifted from contact with the ground.

The stiff springing and torsionally flexible frame provided on traditional commercial vehicles of the heavier type imposes severe limitations both on the ride and road-holding characteristics of the vehicle. The ride of conventional commercial vehicles is further hindered by friction set up between the leaves of the leaf springs and during small wheel oscillations because of this inter leaf friction, the springs hardly function at all with such oscillations being absorbed by the tyres. Not the least of the disadvantages of current commercial vehicles is the phenomenon known as "cab nod" by which is meant that vibration which is set up in the driving cab due to the flexibility of the frame.

Some amelioration of ride discomfort and of the consequent risk of damage to goods may be derived from the use of air springs. However, air springs require continuously acting levelling devices in order to replenish any air which leaks from the suspension system. Air spring suspension systems also require continuously acting hydraulic dampers.

A great step forward, both as regards ride comfort and road-holding has been achieved in the last few years in passenger automobiles by the adoption of independent wheel suspension systems to all wheels. Among the advantages achieved by independent wheel suspension systems may be mentioned the following. The spring base is considerably widened to that of the track so that the resistance to roll afforded by the suspension system is very considerably greater than that afforded by a system using a beam axle and leaf springs. As the resistance to roll is increased, the springs can be made much softer, thus contributing to ride comfort. By eliminating the axle, the unsprung weight may be reduced by as much as 60% or more, enabling the wheels to be maintained in contact with the ground even under high frequency oscillations set up by the road surface. The interaction between one wheel and another due to gyroscopic effects is eliminated. The wheels may be individually and properly located against braking reactions and finally, friction both in the springs, in the wheel locating linkages and in the steering assembly may more easily be reduced to minimum and in the case of the steering, it is possible to utilize rack and pinion steering gear, which for a variety of reasons is efficient and advantageous.

It is necessary to mount the wheel suspensions on a stiff structure. This must be achieved by providing the sprung structure with a high degree of inherent stiffness and particularly torsional stiffness. In small passenger vehicles equipped with soft independent suspension, it is customary to design the whole of the body structure, including the sides and roof of the vehicle, so that it contributes to the desired degree of torsional rigidity. One of the most significant differences between commercial vehicles and small passenger automobiles is that the load carrying body can generally not be used to the same effect. The load carrying platform is usually merely a base on which the load can sit while any sides provided do not contribute significantly to the overall structural strength and due to the large scale of a commercial vehicle as compared with a passenger car, special means must be provided to obtain the required degree of stiffness which may be of the order of 20,000 lbs./ft./degree as against 5,000 to 6,000 lbs. ft./degree for a large car. As there is no possibility of obtaining this stiffness by designing the load carrying upper bodywork using monocoque principles, use must be made of the under-frame of the vehicle in order to obtain this required degree of stiffness. However, this degree of stiffness must not be obtained at the expense of adding to any significant degree to the weight of the frame, since a commercial vehicle requires to be as light as possible and yet have sufficient strength and power to carry its load with safety, speed and efficiency.

Accordingly, the present invention has for its general object to provide an improved chassis suitable for the heavier type of commercial vehicle (for example, for a so-called truck or a public service vehicle, passenger carrying omnibus or coach). More particularly the object is to provide such a chassis with an extremely stiff under-frame structure matched with a suspension system which together give a smooth ride and good road holding in both the laden and unladen conditions.

Broadly stated, the present invention provides a chassis for a commercial vehicle having two or more independently suspended front steerable wheels and two or more independently suspended rear non-steerable wheels, the chassis including a torsionally stiff frame structure extending between the front and rear wheels, this structure having a generally quadrilateral transverse section and having an upper generally horizontal latticed deck situated above the level of the top of the wheels and positioned to support the load carrying platform, a lower generally horizontal latticed deck situated below the level of the wheel centres, but whose minimum height is determined by ground clearance, the upper and lower decks being spaced apart by downwardly extending truss means constituting opposite sides of the structure and said decks being so constructed as to be substantially rigid in their own planes in the direction transversely of the vehicle chassis and said truss means being effective to prevent movement of said decks relative to one another in the direction longitudinally of said vehicle chassis.

This structure is preferably trapezoidal in transverse cross section with the upper deck having substantially greater width than the lower deck whose width preferably exceeds the distance between the upper and lower latticed decks, but is determined by front wheel lock clearance.

The lower deck is suitably positioned to support the ancilliary equipment always found on commercial vehicles (i.e. fuel tank, spare wheel, batteries etc.) while the side decks, or even all decks, are suitably apertured to provide access to such equipment. Moreover, the hollow quadrilateral cross sectional shape of the frame conveniently accommodates the engine, the gear box, the transmission shafts and ancilliaries such as brake gear, hydraulic pumps for tipping gear and power take off.

The top, bottom and side decks are constituted preferably of tubes which can be of considerably lighter weight than the material normally used in commercial vehicle frames with the structural strength being derived from the quadrilateral cross section of the frame.

Although a clad or partly clad construction may be employed, preferably the top and bottom decks are each formed by longitudinal beams which are spaced apart by braces so disposed that each deck is stiff in its own plane. A preferred frame structure is constituted by two upper and two lower straight beams all of which extend longitudinally of the vehicle over the full length of the chassis and all of which beams are spaced apart by bracing means so that the structure has a trapezoidal cross section formed by a top and bottom deck and two sides each of which is rendered rigid in its own plane by said bracing means so that the frame structure as a whole is torsionally rigid. The beams and the braces are suitably tubular.

The preferred type of independent wheel suspension system provided on the chassis will now be described.

Each wheel is carried on link means pivotally mounted on the frame structure and in a preferred embodiment the advantage is obtained that identical components are common to all the wheel stations. These comprise upper and lower wishbone links, the upper wishbones being shorter than the lower wishbones which are pivotally connected to the frame at the sides of the lower deck and at the same horizontal level. The upper wishbones are pivotally mounted on the side decks and spring loadings are fed transversely into the horizontal upper deck. Bridging the upper and lower wishbones is a king pin assembly mounting the wheel hubs so that the latter are pivotal about an upwardly extending axis in the steering mode (in the case of the rear nonsteerable wheels, the wheel hub carriers are prevented from such rotation by track links extending from the frame structure). Preferably at all wheel stations the wishbone links are pivotal about axes parallel to the longitudinal centre line of the vehicle with longitudinal loadings being absorbed by a link extending forwardly from the hub carrier to the frame.

Preferably as regards loadings encountered in the springing mode each wheel is supported at least in part by means of a fluid under pressure.

Figure 2:
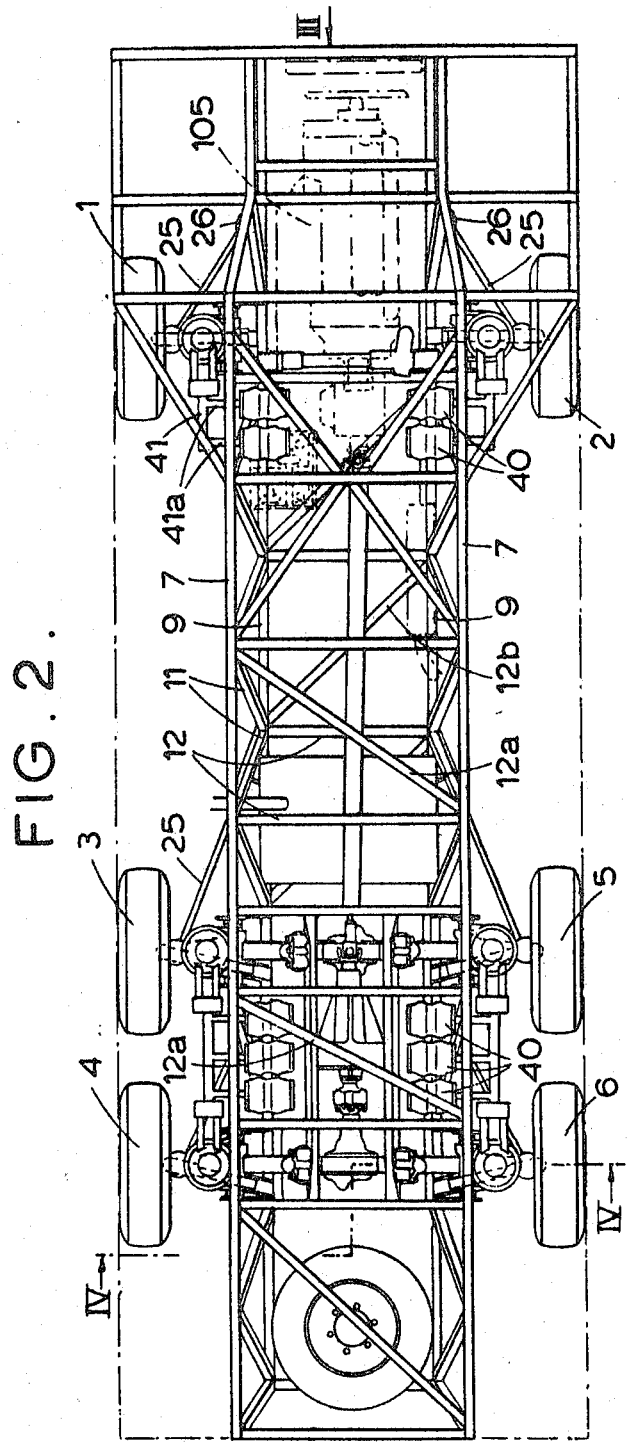
Figure 3:
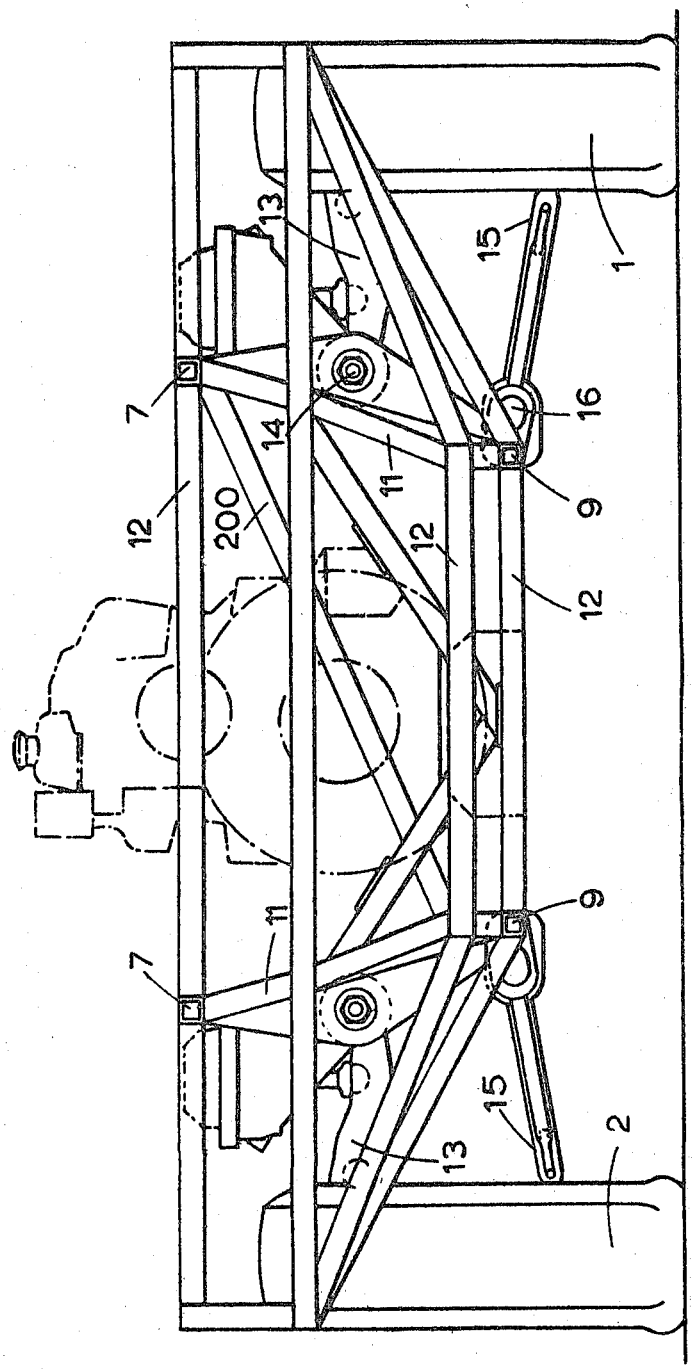
Figure 4:
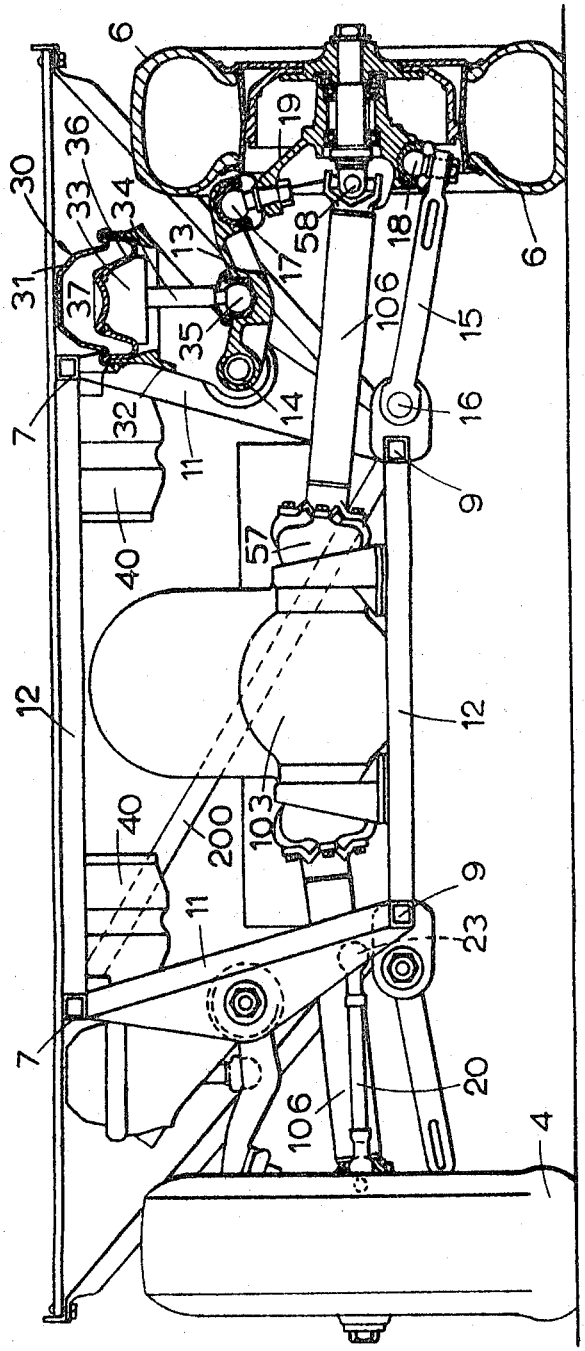
Figure 5:
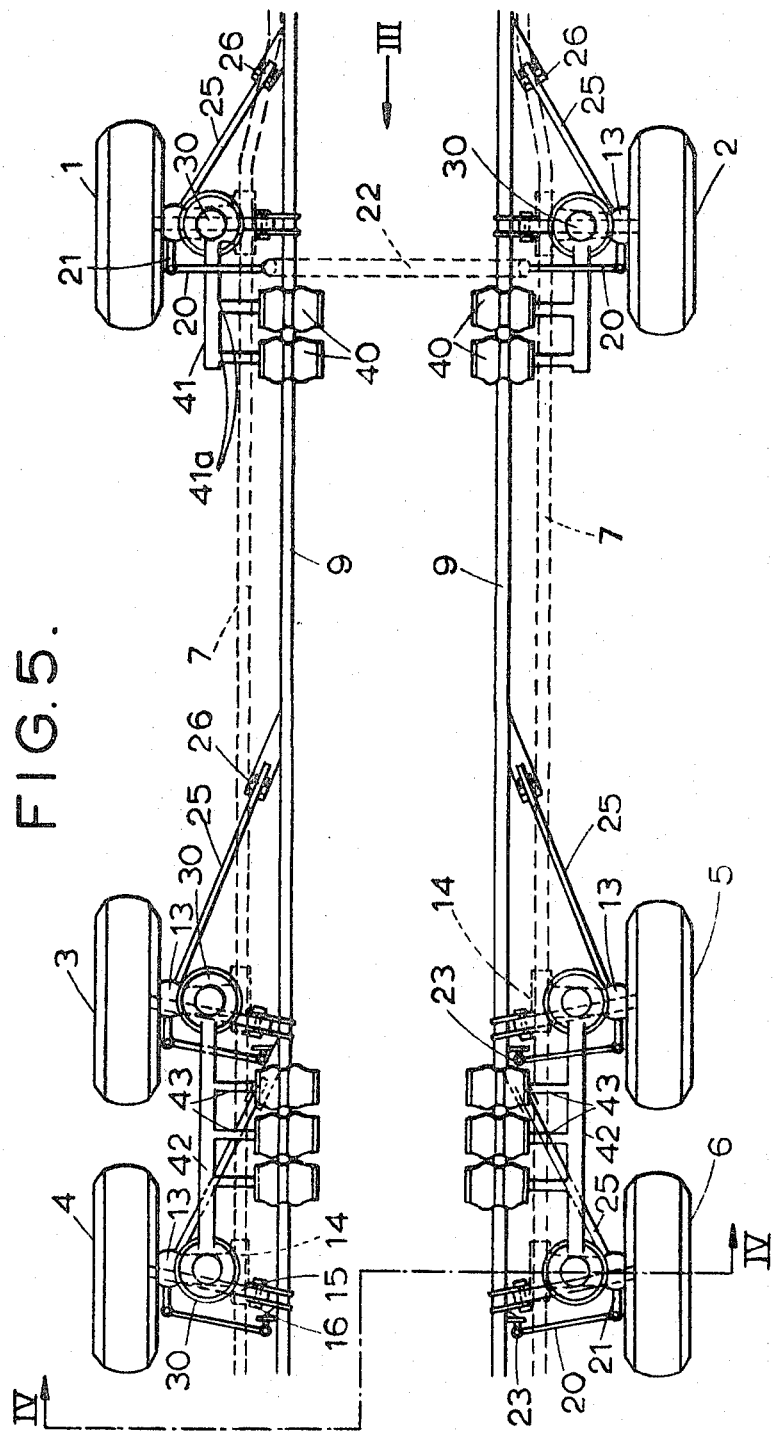
Figure 6:
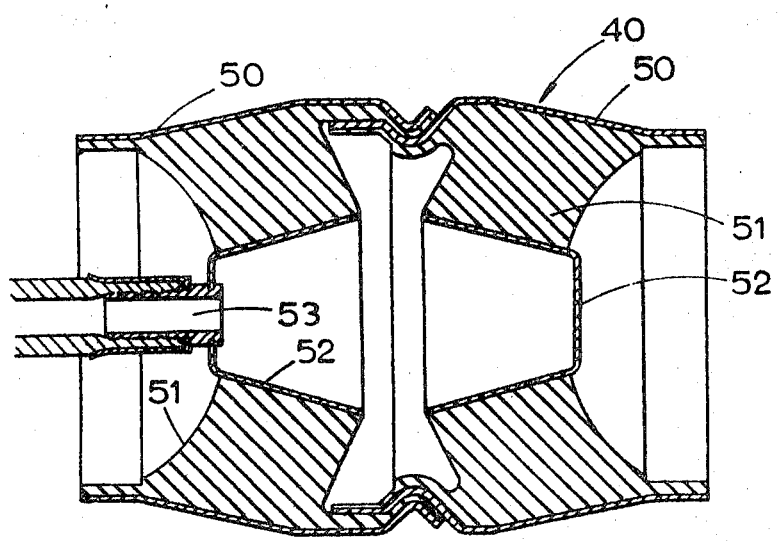

The invention will now be described with reference to the accompanying drawings in which the embodiment of chassis for a truck is illustrated by way of example in the drawings, FIG. 1 is a side view of the chassis, FIG. 2 is a plan view of the chassis, FIG. 3 is an end view taken in the direction of the arrow III of FIG. 2, FIG. 4 is an end view taken in the direction of the arrows IV of FIG. 2, FIG. 5 is a diagrammatic plan view illustrating the suspension system employed, FIG. 6 is a detail cross sectional view of a hydraulic accumulator spring unit.

The chassis illustrated has two front steerable wheels 1 and 2. It further has four rear non-steerable driven wheels 3, 4, 5 and 6 arranged in tandem pairs at the opposite sides of the vehicle.

Each wheel is independently suspended with respect to a frame structure which is essentially stiff in the torsional mode.

In the embodiment illustrated the frame structure is constituted by two upper beams 7 and two lower beams 9 each of which extends longitudinally of the vehicle and each of which is maintained in spaced relationship from the others by lateral trusses 11 and transverse braces 12, so that the frame structure has a generally quadrilateral vertical transverse cross section.

The beams and the braces are preferably tubes of rectangular section.

The upper beams 7 together with the upper transverse braces 12 constitute an upper latticed deck situated above the level of the top of the wheels and hence suitably positioned to support a load carrying platform. The upper latticed deck is rendered rigid in its own plane by diagonal braces 12a.

The lower beams 9 together with the lower transverse braces 12 constitute a lower latticed deck situated at a height above the ground determined by the ground clearance and below the level of the wheel centres. This lower deck is rendered rigid in its own plane by diagonal braces 12b.

The upper and lower decks are maintained in spaced relation from one another by the lateral trusses 11 which are triangulated as shown in FIG. 1 so as to prevent movement of the upper and lower decks relative to one another in the direction longitudinally of the vehicle.

Finally to provide diagonal bracing between the upper and lower decks there are included diagonal braces 200, shown in FIG. 4 extending between the upper beam 7 on one side of the frame, and the lower beam 9 on the opposite side of the frame. Preferably at least two such braces 200 are provided spaced apart from one another towards the opposite ends of the frame.

As will be seen the upper and lower decks together with the lateral trusses 11 render the frame a hollow windowed rigid structure which is quadrilateral in transverse vertical cross section.

The upper deck has greater width than the lower deck so that the structure is in fact trapezoidal in transverse vertical cross section.

The lower deck constitutes a shelf on which components of the vehicle may be firmly fixed and access to such components had through apertures between the lateral trusses 11. In the embodiment shown there are mounted on the lower deck, batteries 101, fuel tank 102, differential and drive transfer boxes 103 and spare wheel 104. Although not shown, there may also be mounted on the lower deck ancilliary equipment such as brake gear, hydraulic pumps for the suspension system or for tipping gear and power take off.

The beams 7 and 9, the braces 12, 12a and 12b and the trusses 11 are in the embodiment shown tubes of rectangular section. The tubes are suitably of mild steel and are electric arc welded together. Testing has shown that such a frame has great torsional stiffness and can be made with a stiffness of 7,000 lbs. ft./degree over the mean wheel base. Such a stiffness is some 70 times greater than the stiffness of traditional commercial vehicle frames of equivalent weight.

Ahead of the front wheel centre at the front of the frame is an extension on which is mounted the tractive unit 105 conveniently a compression ignition engine. This extenssion is of tubular construction, the tubes of which it consists being suitably arranged to accommodate the unit 105 and to provide a deck 106 on which a driver's cab (not shown) may be mounted. The driver's cab is preferably a lightweight fully demountable structure consisting essentially of roof, doors, front side and rear panels and windows. It can conveniently be constructed of synthetic plastics material.

Referring now particularly to FIGS. 4 and 5, all wheels 1 to 6 have substantially identical individual wheel suspensions. Each wheel suspension comprises an upper arm 13 extending laterally outwardly from a pivot 14 disposed longitudinally of the chassis and mounted on the lateral trusses 11 of the frame approximately midway between the upper longitudinal beams 7 and the lower longitudinal beams 9. Each wheel suspension also includes a lower arm 15 extending outwardly from a pivot 16 carried on the frame at the level of the lower longitudinal beams 9.

The outer ends of the upper and lower suspension arms 13 and 15 are respectively connected by ball joints 17 and 18 (FIG. 4) to an upper and a lower portion of a king pin assembly generally designated 19, mounting the associated wheel. Each wheel suspension further includes a first link 20 extending inwardly from a trailing lever arm 21 on the king pin assembly 19. In the case of the front wheels 1 and 2 the links 20 are connected to rack and pinion steering gear generally designated 22. In the case of the rear wheels, the first links 20 are connected to the frame at 23.

It will be appreciated that the ball joints 17 and 18 allow each wheel to be rotated in the steering mode relative to the upper and lower locating arms 13 and 15, and that the first links 20 control the orientation of the king pin assembly 19 in the steering mode.

Each wheel suspension further includes a second link 25 extending from the king pin assembly 19 forwardly to a flexible mounting 26 on the frame, said second link 25 absorbing fore and aft reaction forces on its associated wheel.

The upper arm 13 of each wheel suspension operates its own hydraulic displacer generally designated 30 and as can be seen from FIG. 4, each displacer 30 is of the rolling diaphragm type. Each displacer 30 is in hydraulic intercommunication with one or more hydraulic accumulator springs 40.

From the drawings it will be seen that the independent wheel suspensions provided at each station are substantially identical so far as the elements previously described are concerned.

In the case of a front wheel suspension, in the embodiment shown in the drawings each displacer 30 is in hydraulic communication by means of conduit piping 41 having branches 41a with two hydraulic accumulator springs 40 arranged to operate in parallel.

The rear wheels in the embodiment shown are arranged in tandem pairs at each side of the vehicle and the displacers 30 of the tandem pairs are rendered hydraulically interconnected by means of a conduit pipe 42 from which lead branch connections 43 to three hydraulic accumulator springs 40 operating in parallel.

A conduit pipe 44 leads from hydraulic system associated with the left hand rear suspension to a valve generally designated 45 while a conduit 46 leads from the hydraulic system associated with the right hand rear wheel suspension to the valve 45, the valve 45 being operable either to open hydraulic intercommunication between the two identical systems formed, or to prevent flow along the conduits 44 and 46 whereby the two identical systems associated with the rear wheels at the opposite sides of the vehicle are rendered completely independent hydraulically of one another.

A feature of the embodiment of the invention illustrated will be apparent from FIG. 4, from which it will be seen that as each displacer 30 is carried in a casing 32, which is pivotally mounted on pivots 14 for the upper suspension arms 13. Loadings transmitted by the upper suspension arms 13 will cause the displacer to pivot about the pivots 14 with the loadings caused by this tendency to pivot being fed transversely into the frame of the vehicle where they are absorbed by the upper transverse braces 12 bridging the longitudinal upper beams 7. By this method, suspension loadings are fed into the frame over widely distributed points. As will be apparent also from FIG. 4, the vehicle frame forms a convenient mounting for a differential assembly 103 from which drive shafts 106 extend laterally to drive each of the rear wheels, 57 and 58 being universal couplings provided on the drive shafts 106.

Each displacer 30 has a rigid housing 31 carried in the rigid casing 32 which is journalled on the associated pivot 14 of its wheel suspension. The displacer 30 further has a piston 33 which is connected by a strut 34 and a ball joint 35 to move with the upper wheel suspension arm 13 of the associated wheel suspension. Bridging the gap between the rigid housing 31 and the piston 33 is a generally frusto-conical flexible diaphragm 36 which together with the housing 31 defines a displacer chamber 37. The chamber 37 is liquid filled and has an outlet port (not shown) to which will be joined an interconnecting conduit (the conduit 41 in the case of a front wheel suspension, the conduit 42 in the case of a rear wheel suspension).

As each suspension arm 13 rises or falls, the associated piston 33 of its displacer unit will rise or fall also and liquid will be displaced to or from the chamber 37 of its associated displacer unit 30.

Each hydraulic accumulator spring 40 will now be described in greater detail with refernce to FIG. 6. Each spring 40 comprises a rigid housing constituted by two identical components 50 which are rigidly connected end to end. Each component 50 is a hollow frusto-conical drum having bonded within its bore an annular body 51 of rubber which has a hollow bore within which is a cup-shaped member generally designated 52. In the case of one of the cup members 52 is a port 53 for connection to the branch connections 41a in the case of the front wheel suspensions, and 43 in the case of the rear wheel suspensions. The interior of the spring defined by the cup members 52 and the bodies of rubber 51 defines a chamber of variable volume which is completely filled with hydraulic fluid as are the conduit pipes 41, 41a, 42, 43, 44 and 46.

Dealing now with the operation of a front wheel suspension when the wheel rises, liquid will be displaced from the displacer unit 30 along conduits 41 and 41a into the interiors of the two hydraulic accumulator springs 40 operating in parallel. The influx of fluid into the interior of each spring 40 will cause the two cup members 52 to diverge with the surrounding rubber bodies 51 being deflected so that the influx of fluid is resiliently resisted. The deflection will be in both shear and compression due to the conical shaping of the cup members and of the housing 50. It will be appreciated, therefore, that the hydraulic system associated with each front wheel suspension will afford that suspension springing in the bounce and roll modes. It will be further noted that the hydraulic systems respectively associated with the wheel suspensions of the front wheels 1 and 2 at each side of the vehicle are completely independent of one another so that the functioning of the suspension associated with the front wheel 1 will be completely independent of the functioning of the suspension associated with the front wheel 2.

Damper valves may be included to control flow between the front displacers 30 and their associated hydraulic accumulator springs 40 to provide shock absorption.

In the case of the rear wheels it will be noted that the displacers associated with the wheels 3 and 4 in tandem are directly hydraulically interconnected by the conduit pipe 42. A similar arrangement pertains to the displacers 30 associated individually with the wheel suspensions of wheels 5 and 6. The conduits 42 are each connected by the conduits 43 with a battery of three hydraulic accumulator springs 40 operating in parallel. In all respects the displacers 30 and springs 40 are similar to those described above in connection with the front suspension.

Although the chassis illustrated has six wheels, it will be appreciated that if a four wheeled chassis is required the rear-most wheels 4 and 6 together with their associated suspension components may be omitted.

The hydraulic suspension systems associated with the wheels 1, 3 and 4 or 2, 5 and 6, that is with the wheels on the same side, may be interconnected hydraulically.

Alternatively, the hydraulic suspension system associated with the rear wheels 3 and 4 on one side of the vehicle may be interconnected hydraulically with the corresponding wheels 5 and 6, employing the system described in our copending application.

Moreover, instead of the rubber hydraulic accumulator springs 40 shown in FIG. 6, there may be employed a pneumo-hydraulic accumulator spring, viz. one employing a gas under pressure as resilient medium.

The hydraulic systems may include means for raising or lowering the pressure of the hydraulic fluid to adjust for changes of load or to vary the ground clearance.

I claim:

1. A chassis for a self-propelled commercial vehicle having at least two independently suspended front steerable wheels and at least two independently suspended rear non-steerable wheels, there being a frame structure extending between the frontmost and rearmost wheels having all of the following features:
    (a) two upper and two lower longeron tubes each of which extends in a straight line over the full distance between the centres of the frontmost and rearmost wheels;
    (b) the two upper longeron tubes being maintained in spaced relationship by bracing tubes at least some of which extend diagonally between the longeron tubes, with said upper longeron tubes and said bracing tubes forming an upper open flat generally horizontal deck which is stiff in its own plane and extends fore and aft over the full wheelbase of the vehicle, said upper deck being located above the level of the tops of the wheels;
    (c) the two lower longeron tubes being maintained in spaced relationship by bracing tubes at least some of which extend diagonally between the longeron tubes with said lower longeron tubes and said bracing tubes forming a lower open flat generally horizontal deck which is stiff in its own plane and extends fore and aft over the full wheelbase of the vehicle, said lower deck being located below the level of the centres of the wheels;
    (d) truss tubes extending diagonally between the upper and lower longeron tubes at each respective side of the frame structure, said truss means being effective to prevent movement of said decks relative to one another in a direction longitudinally of the vehicle frame;
    (e) diagonal bracing tubes extending diagonally and transversely of the frame between said upper deck and said lower deck;
    (f) said frame structure consitituting a stiff windowed box structure of quadrilateral section extending continuously over at least the full wheelbase of the vehicle.

2. A chassis for a commercial vehicle according to claim 1 wherein the upper deck is wider than the lower deck and narrower than the track of the vehicle.

3. A chassis for a commercial vehicle according to claim 1 wherein the longeron tubes, the bracing tubes, the truss tubes and the diagonal tubes are all hollow metal elements of quadrilateral section.

References Cited

UNITED STATES PATENTS

| | | | |
|---|---|---|---|
| 1,962,497 | 6/1934 | Francis | 280—106 |
| 2,718,409 | 9/1955 | Kishline | 280—106.5 |
| 2,912,253 | 11/1959 | Harris et al. | 280—106.5 |

PHILIP GOODMAN, Primary Examiner